(12) United States Patent
Mizobe

(10) Patent No.: US 11,780,605 B2
(45) Date of Patent: Oct. 10, 2023

(54) RUNWAY-EMBEDDED FLASH LIGHTING DEVICE

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 17/964,666

(22) Filed: Oct. 12, 2022

(65) Prior Publication Data

US 2023/0034280 A1 Feb. 2, 2023

Related U.S. Application Data

(63) Continuation of application No. 17/287,609, filed as application No. PCT/JP2019/032558 on Aug. 21, 2019, now Pat. No. 11,498,698.

(30) Foreign Application Priority Data

Oct. 26, 2018 (JP) .................. 2018-201404

(51) Int. Cl.
*F21V 29/503* (2015.01)
*B64F 1/20* (2006.01)
(Continued)

(52) U.S. Cl.
CPC ............... *B64F 1/20* (2013.01); *B64D 45/08* (2013.01); *F21S 10/06* (2013.01); *F21V 5/043* (2013.01);
(Continued)

(58) Field of Classification Search
CPC . B64F 1/20; B64F 1/205; B64F 1/002; B64D 45/08; B64D 2203/00; F21S 10/06;
(Continued)

(56) References Cited

U.S. PATENT DOCUMENTS 3,113,726 A 12/1963 Pennow et al.
3,200,243 A 8/1965 McDevitt et al.
(Continued)

FOREIGN PATENT DOCUMENTS

CA 3 003 702 A1 5/2017
CN 101761840 A 6/2010
(Continued)

OTHER PUBLICATIONS

English translation of Young KR-100952375-B1, published Apr. 2010 (Year: 2010).*

(Continued)

*Primary Examiner* — Evan P Dzierzynski
(74) *Attorney, Agent, or Firm* — Sughrue Mion, PLLC

(57) ABSTRACT

A runway-embedded flash lighting device, including: a body; a ceiling member; a light guide member; and an LED flash light source, wherein the body is configured to be embedded in a runway, the ceiling member is disposed in an upper opening of the body and configured to be exposed to a runway surface when the body is embedded in the runway, the ceiling member includes a flash emission window, the light guide member is disposed in the flash emission window, the LED flash light source is disposed inside the body and configured to emit a flash toward the light guide member, and the light guide member is configured to allow the flash emitted from the LED flash light source to be emitted from the flash emission window to outside the runway-embedded flash lighting device.

12 Claims, 11 Drawing Sheets

(51) Int. Cl.
| | |
|---|---|
| *B64D 45/08* | (2006.01) |
| *F21S 10/06* | (2006.01) |
| *F21V 5/04* | (2006.01) |
| *F21V 15/01* | (2006.01) |
| *F21V 17/06* | (2006.01) |
| *F21Y 115/10* | (2016.01) |
| *F21W 111/06* | (2006.01) |

(52) U.S. Cl.
CPC .............. *F21V 15/01* (2013.01); *F21V 17/06* (2013.01); *F21V 29/503* (2015.01); *B64D 2203/00* (2013.01); *F21W 2111/06* (2013.01); *F21Y 2115/10* (2016.08)

(58) Field of Classification Search
CPC .......... F21S 8/022; F21V 5/043; F21V 15/01; F21V 17/06; F21V 29/503; F21V 5/04; F21W 2111/06; F21Y 2115/10
See application file for complete search history.

(56) References Cited

U.S. PATENT DOCUMENTS

| | | | |
|---|---|---|---|
| 3,327,104 A * | 6/1967 | Loch | E01F 9/559 362/223 |
| 3,369,114 A | 2/1968 | Carter | |
| 3,624,379 A | 11/1971 | Bliss et al. | |
| 4,112,485 A | 9/1978 | Sutter | |
| 4,860,182 A | 8/1989 | Vadseth | |
| 5,676,448 A | 10/1997 | Urbaing | |
| 6,354,714 B1 | 3/2002 | Rhodes | |
| 6,669,351 B1 | 12/2003 | Shea et al. | |
| 7,068,188 B1 | 6/2006 | Krause et al. | |
| 7,168,825 B2 * | 1/2007 | McArthur | F21V 17/12 362/153.1 |
| 7,201,490 B1 | 4/2007 | Bieberdorf et al. | |
| 7,344,266 B2 * | 3/2008 | Coman | E01F 9/559 362/153.1 |
| 8,128,254 B2 * | 3/2012 | Laenen | F21V 5/04 362/153.1 |
| 2003/0048634 A1 | 3/2003 | You et al. | |
| 2005/0040424 A1 | 2/2005 | Erchak et al. | |
| 2006/0072312 A1 | 4/2006 | Cuypers et al. | |
| 2008/0007430 A1 | 1/2008 | Wang et al. | |
| 2010/0053946 A1 | 3/2010 | Laenen et al. | |
| 2010/0277901 A1 | 11/2010 | Farchtchian et al. | |
| 2011/0121734 A1 | 5/2011 | Pape | |
| 2012/0218742 A1 | 8/2012 | Beukema et al. | |
| 2013/0170205 A1 | 7/2013 | Abel et al. | |
| 2016/0281965 A1 | 9/2016 | Schneider et al. | |
| 2016/0327258 A1 | 11/2016 | Sloan | |
| 2017/0211247 A1 | 7/2017 | Messiou et al. | |
| 2017/0299160 A1 | 10/2017 | Salazar et al. | |
| 2018/0162554 A1 | 6/2018 | Marquez et al. | |
| 2018/0328550 A1 | 11/2018 | Mizobe | |
| 2021/0394926 A1 | 12/2021 | Mizobe | |
| 2021/0394927 A1 | 12/2021 | Mizobe | |
| 2021/0394928 A1 | 12/2021 | Mizobe | |
| 2021/0394929 A1 | 12/2021 | Mizobe | |

FOREIGN PATENT DOCUMENTS

| | | | |
|---|---|---|---|
| CN | 102537772 A * | 7/2012 | |
| CN | 102537772 A | 7/2012 | |
| CN | 202501314 U | 10/2012 | |
| DE | 20 2009 009 583 U1 | 9/2009 | |
| JP | 2000-228103 A | 8/2000 | |
| JP | 2012-204205 A | 10/2012 | |
| JP | 2016-026929 A | 2/2016 | |
| JP | 2016-195072 A | 11/2016 | |
| JP | 2017-054675 A | 3/2017 | |
| KR | 10-0952375 B1 | 4/2010 | |
| KR | 100952375 B1 * | 4/2010 | |
| WO | 2009/077010 A1 | 6/2009 | |
| WO | 2017/001158 A1 | 1/2017 | |
| WO | 2017/081999 A1 | 5/2017 | |
| WO | 2020/084880 A1 | 4/2020 | |
| WO | 2020/084881 A1 | 4/2020 | |
| WO | 2020/084882 A1 | 4/2020 | |
| WO | 2020/084884 A1 | 4/2020 | |

OTHER PUBLICATIONS

English translation of Zhou CN-102537772-A published Jul. 2012 (Year: 2012).*
Office Action issued in the related U.S. Appl. No. 17/859,652 dated Nov. 10, 2022.
Office Action issued in the related U.S. Appl. No. 17/833,955 dated Oct. 11, 2022.
Office Action issued in the related Japanese patent application (No. 2020-516778) dated Nov. 8, 2022.
Office Action issued in the related Japanese patent application (No. 2020-516779) dated Nov. 15, 2022.
Office Action issued in the corresponding Japanese patent application (No. 2020-516781) dated Nov. 22, 2022.
Office Action dated Dec. 23, 2022 in Canadian Application No. 3,110,305.
International Search Report for PCT/JP2019/032554 dated Oct. 15, 2019.
International Search Report for PCT/JP2019/032558 dated Oct. 15, 2019 [PCT/ISA/210].
International Search Report for PCT/JP2019/032555 dated Oct. 21, 2019.
International Search Report for PCT/JP2019/032556 dated Oct. 21, 2019.
Office Action dated Nov. 15, 2021 in related U.S. Appl. No. 17/287,606.
Office Action dated Nov. 19, 2021 in U.S. Appl. No. 17/287,608.
Office Action dated Dec. 3, 2021 in U.S. Appl. No. 17/287,604.
Australian Examination Report dated Nov. 15, 2021 in Australian Patent Application No. 2019367751.
Communication dated Mar. 8, 2022, issued in Australian Application No. 2019365599.
Communication dated Mar. 30, 2022, issued in Australian Application No. 2019367751.
Extended European Search Report dated Jun. 3, 2022 in European Application No. 19877393.9.
Extended European Search Report dated Jun. 1, 2022 in European Application No. 19875490.5.
Extended European Search Report dated Jun. 1, 2022 in European Application No. 19876239.5.
English machine translation of Young KR 10-0952375, published 2010 (Year: 2010).

* cited by examiner

RUNWAY-EMBEDDED FLASH LIGHTING DEVICE

CROSS REFERENCE TO RELATED APPLICATIONS

This application is a Continuation of U.S. application Ser. No. 17/287,609 filed Apr. 22, 2021, which is a National Stage of International Application No. PCT/JP2019/032558 filed Aug. 21, 2019, claiming priority based on Japanese Patent Application No. 2018-201404 filed Oct. 26, 2018.

TECHNICAL FIELD

The present invention relates to a runway-embedded flash lighting device.

BACKGROUND ART

Conventionally, marker lamps for emitting marker light have been embedded under an airfield runway as a guide sign (for example, see Patent Literature 1). In the marker lamp embedded under an airfield runway, a discharge lamp containing xenon is sometimes used as a flash light source.

CITATION LIST

Patent Literature

Patent Literature 1: JP 2000-228103 A

SUMMARY OF INVENTION

Technical Problem

However, a flash lighting device using a xenon flash light source is heavy, has a short life, has a low effective luminous intensity, cannot switch the luminous intensity among high luminous intensity, medium luminous intensity, and low luminous intensity, and consumes a large amount of power.

With the foregoing in mind, it is an object of the present invention to provide a new runway-embedded flash lighting device that is light, has a long life, has high effective luminous intensity, can switch the luminous intensity, and is low in power dissipation.

Solution to Problem

In order to achieve the above object, according to one aspect of the present invention there is provided a runway-embedded flash lighting device, which includes: a cylindrical body; a ceiling member; a light guide member; and an LED flash light source, wherein the cylindrical body can be embedded in a runway, the ceiling member is placed in an upper opening of the cylindrical body in a state of being able to be exposed to a runway surface when the cylindrical body is embedded in the runway, the ceiling member is provided with a flash emission window, the light guide member is placed in the flash emission window, the LED flash light source is placed inside the cylindrical body in a state of capable of emitting flash toward the light guide member placed in the flash emission window, and the light guide member allows flash emitted from the LED flash light source to be emitted to an outside from the flash emission window.

Advantageous Effects of Invention

The runway-embedded flash lighting device of the present invention is light, has a long life, has high effective luminous intensity, can switch the luminous intensity, and is low in power dissipation.

DESCRIPTION OF EMBODIMENTS

Figure 1:
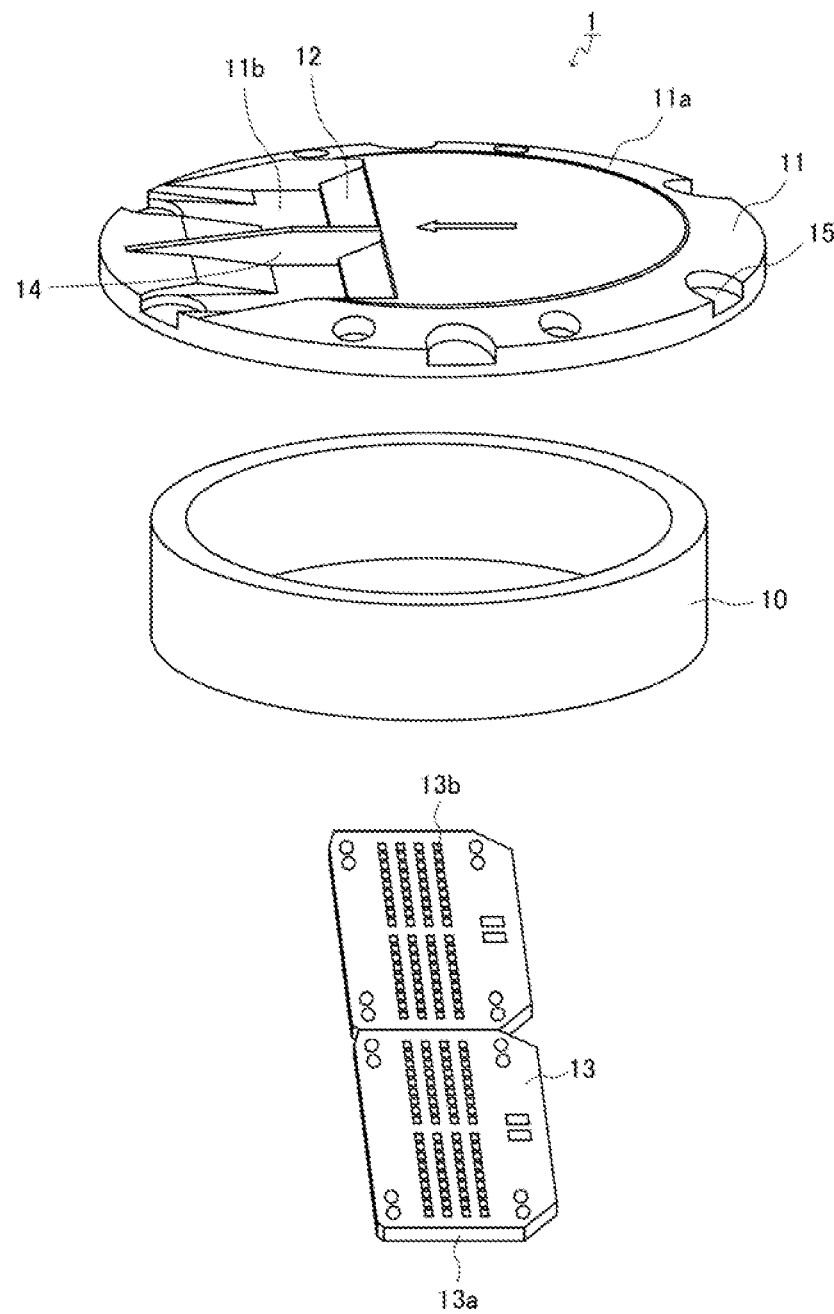
FIG. 1 is an exploded perspective view showing the configuration of an example of the runway-embedded flash lighting device according to the first example embodiment.

Next, example embodiments of the present invention will be described with reference to FIGS. 1 to 11. The present invention, however, is not limited or restricted to the following example embodiments by any means. In FIGS. 1 to 11, identical parts are indicated with identical reference signs. Regarding the descriptions of the example embodiments, reference can be made to one another. Furthermore, in the drawings, for ease of description, illustration of the structures of the components may be appropriately simplified, and the size, the ratio, and the like of components may be schematically shown and different from actual ones. First example embodiment FIG. 1 is an exploded perspective view showing the configuration of an example of the runway-embedded flash lighting device according to the present example embodiment. As shown in FIG. 1, a runway-embedded flash lighting device 1 includes a cylindrical body 10, a ceiling member 11, a light guide member 12, and an LED flash light source 13.

The cylindrical body 10 can be embedded in a runway 2 as will be described below with reference to FIG. 9 in the third example embodiment. The cylindrical body 10 may be, for example, a circular cylinder as shown in FIG. 1, or may be a cylinder other than a circular cylinder such as an elliptical cylinder or a polygonal cylinder.

The ceiling member 11 is placed in the upper opening of the cylindrical body 10 in a state of being able to be exposed to the runway surface when the cylindrical body 10 is embedded in the runway 2.

Figure 2:
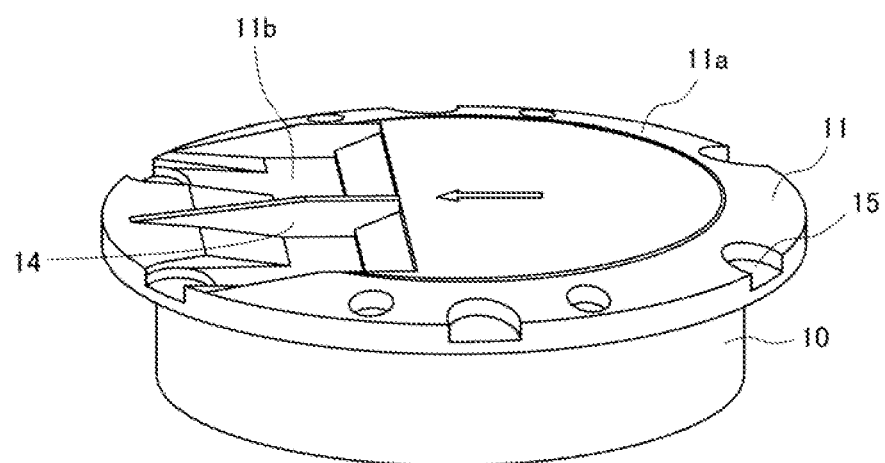
FIG. 2 is a perspective view from above showing an example of the cylindrical body and ceiling member in the runway-embedded flash lighting device according to the first example embodiment.

The cylindrical body 10 and the ceiling member 11 may be separate members as shown in FIG. 1, or may be integrally molded as an integrally molded product as shown in FIG. 2. Examples of the integrally molded product include aluminum castings, titanium castings, aluminum alloy castings, and titanium alloy castings. Among them, aluminum castings and titanium castings are preferable because they are light, and aluminum castings are particularly preferable because they are inexpensive. When the cylindrical body 10 and the ceiling member 11 are separate members, as in the case of the integrated molding product, the cylindrical body 10 and ceiling member 11 may be, for example, aluminum castings, titanium castings, aluminum alloy castings, or titanium alloy castings.

The ceiling member 11 is provided with a flash emission window, and the light guide member 12 is placed in the flash emission window. The runway-embedded flash lighting device 1 of the present example embodiment may include two or more flash emission windows, and the light guide member 12 may be placed in each of the flash emission windows, for example. If two or more light guide members 12 are used, the burden on the light guide member 12 can be further reduced and damage can be prevented. For example, as shown in FIG. 1, the flash emission window and the light guide member 12 may be divided into two or more by a reinforcing plate member 14 to be described below. The light guide member 12 may be, for example, a prism lens or the like. The material of the prism lens is not particularly limited, and may be, for example, glass or the like.

The ceiling member 11 may have a stepped structure that includes an upper ceiling portion 11a and a lower ceiling portion 11b, wherein the upper ceiling portion 11a is placed on the rear side relative to the emission direction of the flash emission window, and the lower ceiling portion 11b is placed on the emission direction side of the flash emission window, for example.

The runway-embedded flash lighting device 1 of the present example embodiment may further include the reinforcing plate member 14, and the reinforcing plate member 14 may be placed on the outer surface of the lower ceiling portion 11b in a state of standing upright in the vertical direction of the outer surface of the lower ceiling portion 11b, for example. The ceiling member 11 and the reinforcing plate member 14 may be separate members or may be integrally molded as an integrally molded product, for example. When the ceiling member 11 and the reinforcing plate member 14 are separate members, as in the case of the integrated molding product, the reinforcing plate member 14 may be, for example, aluminum castings, titanium castings, aluminum alloy castings, or titanium alloy castings.

The runway-embedded flash lighting device 1 of the present example embodiment may further include a fixing member 15, the fixing member 15 may be placed on the outer peripheral side of the ceiling member 11, and the fixing member 15 may be provided with a screw hole to be inserted with a screw for fixing to the runway 2, for example. The fixing member 15 may have a tapered shape in which the outer surface is inclined so as to be thinner toward the outer periphery, for example. The ceiling member 11 and the fixing member 15 may be, for example, separate members or may be integrally molded as an integrally molded product. When the ceiling member 11 and the fixing member 15 are separate members, as in the case of the integrated molding product, the fixing member 15 may be, for example, aluminum castings, titanium castings, aluminum alloy castings, or titanium alloy castings. At least one of the ceiling member 11 and the fixing member 15 may have a hole through which the runway-embedded flash lighting device 1 is pulled up by a tool.

Figure 3:
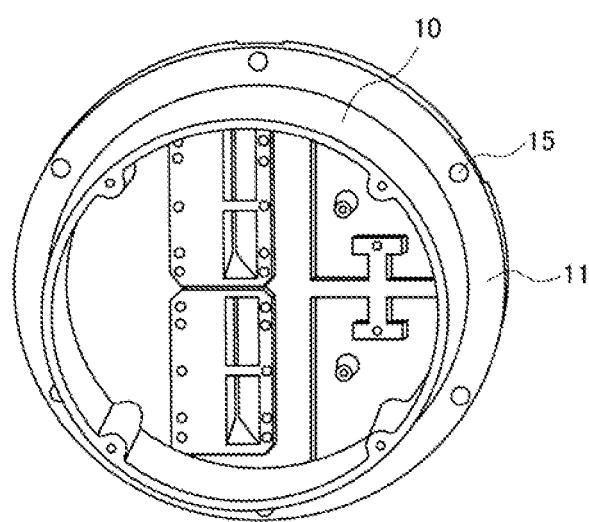
FIG. 3 is a perspective view from below showing an example of the cylindrical body and ceiling member in the runway-embedded flash lighting device according to the first example embodiment.

The LED flash light source 13 is placed inside the cylindrical body 10 in a state of capable of emitting flash toward the light guide member 12 placed in the flash emission window. FIG. 3 is a perspective view from below showing an example of the cylindrical body 10 and ceiling member 11. For example, as shown in FIG. 3, the inner surface of the ceiling member 11 (the surface on the cylindrical body 10 side) may be provided with a site to be placed with the LED flash light source 13 below the flash emission window. The light guide member 12 allows flash emitted from the LED flash light source 13 to be emitted to the outside from the flash emission window.

The LED flash light source 13 may be, for example, an LED module or the like. The LED flash light source 13 includes a substrate 13a and an LED 13b, and the LED 13b is placed on the substrate 13a as shown in FIG. 1, for example. While the number of the LED flash light sources 13 is two in the example shown in FIG. 1, the number of LED flash light sources 13 may be one or three or more.

The conditions for mounting the LED 13b on the substrate 13a is not particularly limited, and can be appropriately set according to the desired optical properties. FIG. 1 shows an example in which 4×9=36 matrixes are two, i.e., seventy-two LEDs 13b are mounted on the substrate 13a.

The shape of the LED 13b is not particularly limited, and is generally a square shape or a rectangular shape. The size of the LED 13b is not particularly limited, and in the case of a square, the length of one side is, for example, 1.8 to 2.2 mm, 3 to 3.5 mm, or 4 to 5.3 mm, and in the case of a rectangle, the length of the short side is, for example, the same as the length of the square, and the ratio of the short side to the long side is, for example, 1:1 to 3. On the surface of the substrate 13a to which the LEDs 13b are mounted, the width between the adjacent LEDs is, for example, 0.2 to 0.5 mm.

Figure 4:
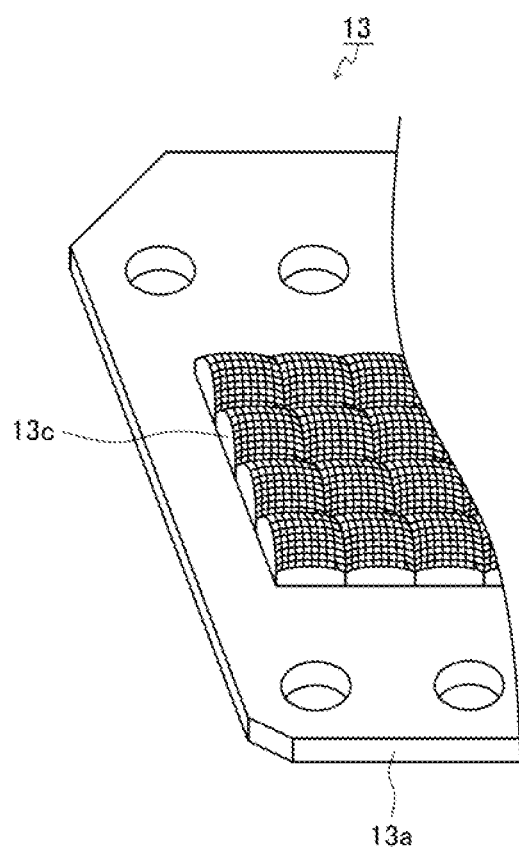
FIG. 4 is a partially enlarged perspective view showing an example of the LED flash light source in the runway-embedded flash lighting device according to the first example embodiment.
Figure 5:
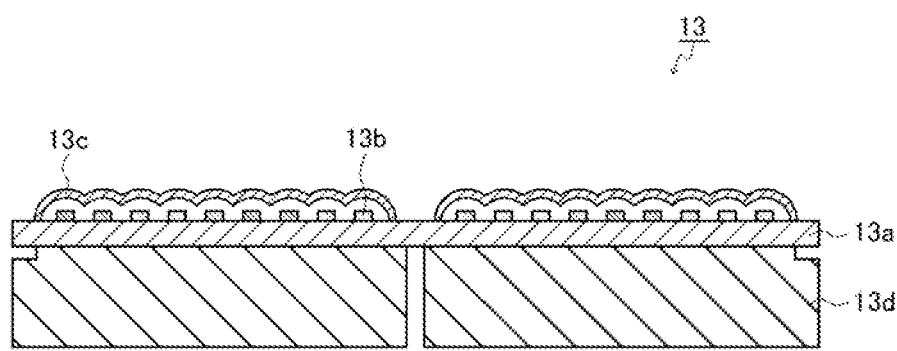
FIG. 5 is a cross-sectional view showing an example of the LED flash light source in the runway-embedded flash lighting device according to the first example embodiment.

The LED flash light source 13 may include a lens member 13c, the lens member 13c may be placed above the LED 13b, and the lens member 13c may be a lens member that allows the emission surface of flash emitted from the LED 13b to have a uniform illuminance distribution, for example, as shown in the partially enlarged perspective view of FIG. 4 and the cross-sectional view of FIG. 5. Examples of the lens member 13c include a fly-eye lens and an integrator lens. For example, as shown in FIG. 5, by dividing the lens member 13c into two or more pieces so as not to become too large, the burden on the lens member 13c can be further reduced and damage can be prevented. It is preferable that the lens member 13c be not too small so as not to cause loss in extraction of the emitted flash.

The runway-embedded flash lighting device 1 of the present example embodiment may further include a heat radiating member 13d, and the heat radiating member may be placed on the substrate 13a of the LED flash light source 13 on the surface opposite to the LED 13b mounting side, for example, as shown in FIG. 5. While FIG. 5 shows an example in which the heat radiating member 13d is a heat radiating fin, it is also possible to radiate heat using a fan or the like that blows air toward the substrate 13a.

Figure 10:
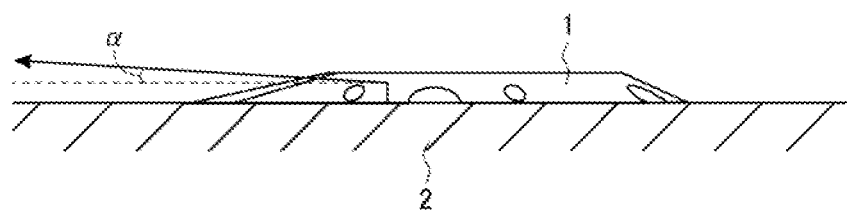
FIG. 10 is a schematic side view explaining flash emission in the runway-embedded flash lighting device according to the first example embodiment.
Figure 11:
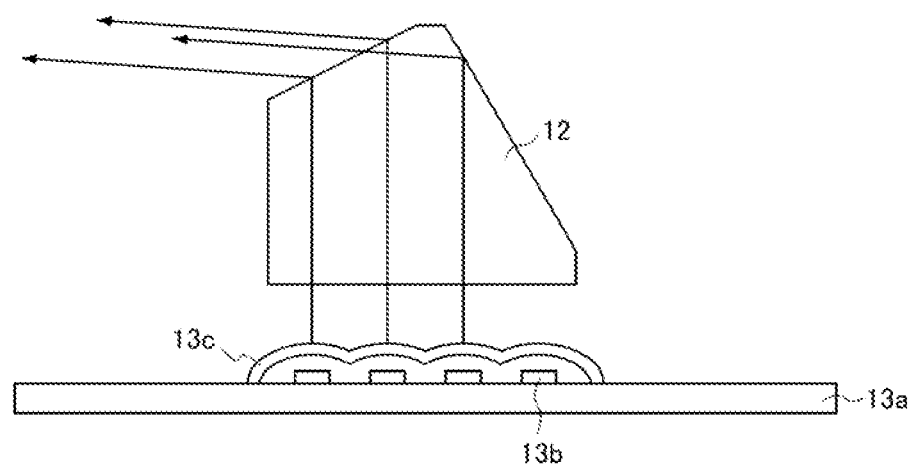
FIG. 11 is a side view showing an example of the light guide member and LED flash light source inside the runway-embedded flash lighting device shown in FIG. 10.

It is preferable that an upward flash having an angle α of about 3 degrees with respect to a direction parallel to the runway surface be emitted from the runway-embedded flash lighting device 1 of the present example embodiment, for example, as shown in FIG. 10. The light guide member 12 and the LED flash light source 13 inside the runway-embedded flash lighting device 1 shown in FIG. 10 can be shown as in FIG. 11.

While the weight of a flash lighting device using a xenon flash light source is 65 kg or less, specifically, about 40 kg, the weight of the runway-embedded flash lighting device 1 of the present example embodiment is, for example, 18 kg or less, specifically, about 11 kg. Thus, according to the present example embodiment, it is possible to provide a light runway-embedded flash lighting device.

While the lifetime of a flash lighting device using a xenon flash light source is about 500 hours, the runway-embedded flash lighting device 1 of the present example embodiment can be used indefinitely, for example. Thus, according to the present example embodiment, it is possible to provide a runway-embedded flash lighting device having a long life.

While the effective luminous intensity of a flash lighting device using a xenon flash light source is 1000 cd or more, specifically about 1200 cd, the effective luminous intensity of the runway-embedded flash lighting device 1 of the present example embodiment is, for example, 6000 cd or more, specifically about 7000 cd. Thus, according to the present example embodiment, it is possible to provide a runway-embedded flash lighting device having a high effective luminous intensity.

While a flash lighting device using a xenon flash light source cannot switch the luminous intensity among high luminous intensity, medium luminous intensity, and low luminous intensity, since the runway-embedded flash lighting device 1 of the present example embodiment has high effective luminous intensity as described above, it can switch the luminous intensity among high luminous intensity (e.g., 6000 cd or more), medium luminous intensity (e.g., 1000 cd or more), and low luminous intensity (e.g., 250 cd or more), for example. Thus, according to the present example embodiment, it is possible to provide a runway-embedded flash lighting device that can switch the luminous intensity. The high luminous intensity is used, for example, in the daytime of poor visibility due to fog, rain, or the like, the low luminous intensity is used, for example, in the night, and the medium luminous intensity is used, for example, in the evening.

While the power dissipation of a flash lighting device using a xenon flash light source is about 500 W, the power dissipation of the runway-embedded flash lighting device 1 of the present example embodiment is, for example, about 80 W (up to 114 W at high luminous intensity, 31 W at medium luminous intensity, 24 W at low luminous intensity). Thus, according to the present example embodiment, it is possible to provide a runway-embedded flash lighting device that is low in power dissipation.

Second Example Embodiment

Figure 6:
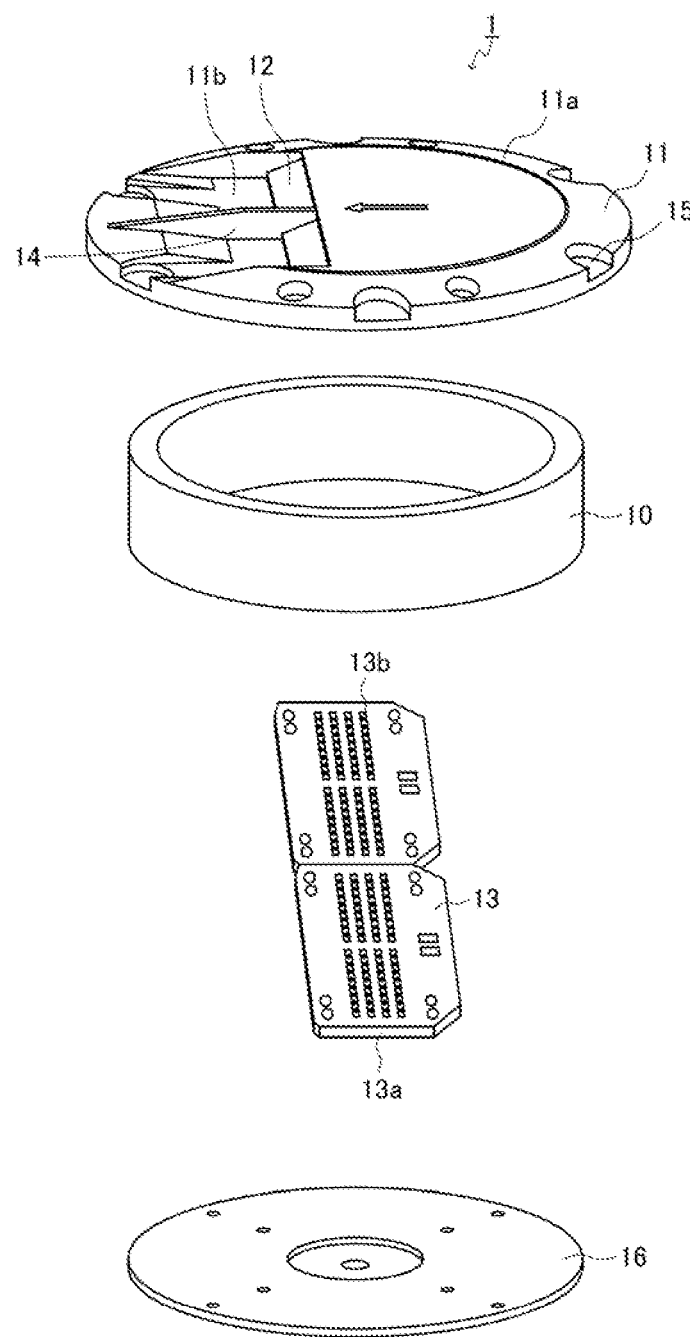
FIG. 6 is an exploded perspective view showing the configuration of an example of the runway-embedded flash lighting device according to the second example embodiment.
Figure 7:
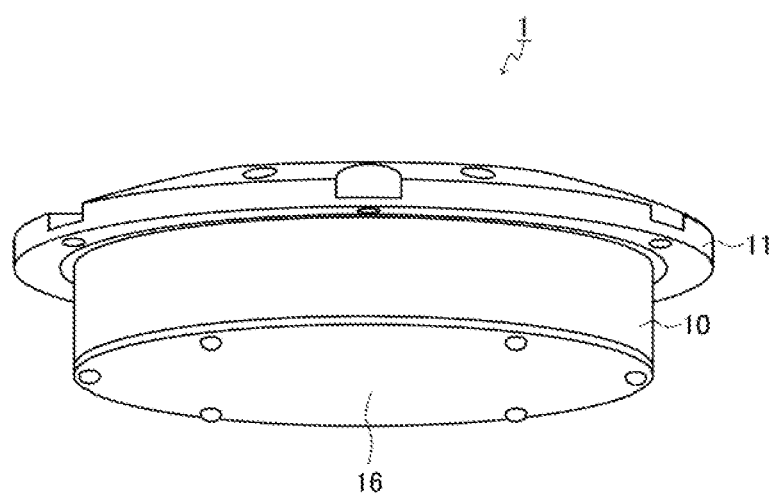
FIG. 7 is a perspective view from below showing the runway-embedded flash lighting device shown in FIG. 6.

FIG. 6 is an exploded perspective view showing the configuration of an example of the runway-embedded flash lighting device of the present example embodiment. FIG. 7 is a perspective view from below showing the runway-embedded flash lighting device shown in FIG. 6. As shown in FIGS. 6 and 7, the runway-embedded flash lighting device 1 of the present example embodiment is the same as the runway-embedded flash lighting device 1 of the first example embodiment except that it includes a bottom cover member 16.

The bottom cover member 16 is placed in a state of closing the lower opening of the cylindrical body 10. Examples of the material of the bottom cover member 16 include aluminum, titanium, aluminum alloy, titanium alloy, and castings thereof.

Figure 8:
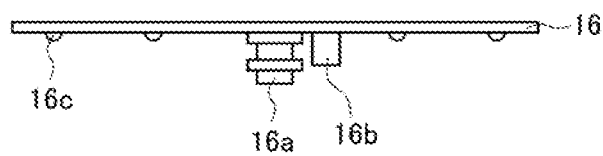
FIG. 8 is a side view showing an example of the bottom cover member of the runway-embedded flash lighting device according to the second example embodiment.

FIG. 8 is a side view showing an example of the bottom cover member 16. For example, as shown in FIG. 8, the bottom cover member 16 may include a cable gland 16a and an external ground terminal 16b. Further, when the bottom cover member 16 is attached to at least one of the cylindrical body 10 and the LED flash light source 13 with a screw 16c and an O-ring (not shown), for example, the runway-embedded flash lighting device 1 can be waterproof.

Third Example Embodiment

Figure 9:
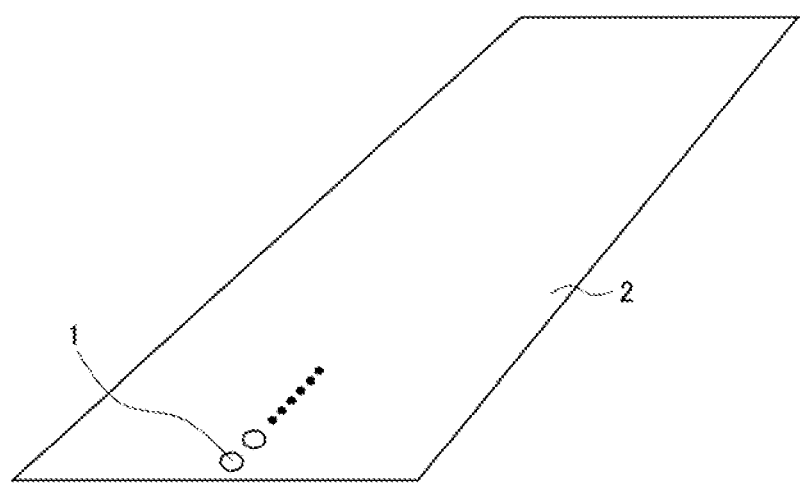
FIG. 9 is a schematic perspective view showing the configuration of an example of the runway according to the third example embodiment.

FIG. 9 is a schematic perspective view showing the configuration of an example of the runway of the present example embodiment. While the runway is shown schematically simplified in FIG. 9, the runway 2 is one in which the runway-embedded flash lighting device 1 of the first or second example embodiment is embedded with the ceiling member 11 exposed.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

Supplementary Notes

Apart of or the whole of the above-described example embodiments can be described as the following supplementary notes. However, the present invention is by no means limited thereto.

(Supplementary Note 1)
A runway-embedded flash lighting device including;
  a cylindrical body;
  a ceiling member;
  a light guide member; and
  an LED flash light source, wherein
  the cylindrical body can be embedded in a runway, the ceiling member is placed in an upper opening of the cylindrical body in a state of being able to be exposed to a runway surface when the cylindrical body is embedded in the runway,
  the ceiling member is provided with a flash emission window,
  the light guide member is placed in the flash emission window,
  the LED flash light source is placed inside the cylindrical body in a state of capable of emitting flash toward the light guide member placed in the flash emission window, and
  the light guide member allows flash emitted from the LED flash light source to be emitted to an outside from the flash emission window.

(Supplementary Note 2)
The runway-embedded flash lighting device according to Supplementary Note 1, wherein
  the cylindrical body and the ceiling member are integrally molded as an integrally molded product.

(Supplementary Note 3)
The runway-embedded flash lighting device according to Supplementary Note 1 or 2, wherein
the LED flash light source includes;
a substrate;
an LED; and
a lens member,
the LED is placed on the substrate,
the lens member is placed above the LED, and the lens member is a lens member that allows an emission surface of flash emitted from the LED to have a uniform illuminance distribution.

(Supplementary Note 4)
The runway-embedded flash lighting device according to Supplementary Note 3, further including:
a heat radiating member, wherein
the heat radiating member is placed on the substrate of the LED flash light source on a surface opposite to an LED mounting side.

(Supplementary Note 5)
The runway-embedded flash lighting device according to any one of Supplementary Notes 1 to 4, wherein
the ceiling member includes an upper ceiling portion and a lower ceiling portion,
the upper ceiling portion is placed on a rear side relative to an emission direction of the flash emission window, and
the lower ceiling portion is placed on an emission direction side of the flash emission window.

(Supplementary Note 6)
The runway-embedded flash lighting device according to Supplementary Note 5, further including:
a reinforcing plate member, wherein
the reinforcing plate member is placed on an outer surface of the lower ceiling portion in a state of standing upright in a vertical direction of the outer surface of the lower ceiling portion.

(Supplementary Note 7)
The runway-embedded flash lighting device according to any one of Supplementary Notes 1 to 6, including:
two or more flash emission windows, wherein
the light guide member is placed in each of the flash emission windows.

(Supplementary Note 8)
The runway-embedded flash lighting device according to any one of Supplementary Notes 1 to 7, further including:
a fixing member, wherein
the fixing member is placed on an outer peripheral portion of the ceiling member, and
the fixing member is provided with a screw hole to be inserted with a screw for fixing to the runway (Supplementary Note 9)
The runway-embedded flash lighting device according Supplementary Note 8, wherein
the ceiling member and the fixing member are integrally molded as an integrally molded product.

(Supplementary Note 10)
The runway-embedded flash lighting device according to any one of Supplementary Notes 1 to 9, further including:
a bottom cover member, wherein
the bottom cover member is placed in a state of closing a lower opening of the cylindrical body.

(Supplementary Note 11)
The runway-embedded flash lighting device according to Supplementary Note 10, wherein
the bottom cover member includes a cable gland and an external ground terminal.

(Supplementary Note 12)
A runway with the runway-embedded flash lighting device according to any one of Supplementary Notes 1 to 11.

This application claims priority from Japanese Patent Application No. 2018-201404 filed on Oct. 26, 2018. The entire subject matter of the Japanese Patent Application is incorporated herein by reference.

INDUSTRIAL APPLICABILITY

The present invention can provide a new runway-embedded flash lighting device that is light, has a long life, has high effective luminous intensity, can switch the luminous intensity, and is low in power dissipation.

REFERENCE SIGNS LIST

1: runway-embedded flash lighting device
2: runway
10: cylindrical body
11: ceiling member
11a: upper ceiling portion
11b: lower ceiling portion
2: light guide member
3: LED flash light source
3a: substrate
3b: LED
3c: lens member
3d: heat radiating member
4: reinforcing plate member
5: fixing member
6: bottom cover member
6a: cable gland
6b: external ground terminal
6c: screw

The invention claimed is:
1. A runway-embedded flash lighting device comprising:
a body configured to be embedded in a runway;
a ceiling member disposed in an upper opening of the body and configured to be exposed to a runway surface when the body is embedded in the runway, the ceiling member comprising an upper ceiling portion and a lower ceiling portion, and at least a first flash emission window and a second flash emission window, the upper ceiling portion being disposed on a rear side relative to an emission direction of at least one of the at least first flash emission window and second flash emission window, and the lower ceiling portion being disposed on an emission direction side of at least one of the at least first flash emission window and second flash emission window;
a reinforcing plate member disposed on an outer surface of the lower ceiling portion of the ceiling member in a state of standing upright in a vertical direction with respect to the outer surface of the lower ceiling portion;
first and second light guide members, respectively being divided by the reinforcing plate member, the first light guide member being disposed in the first flash emission window, and the second light guide member being disposed in the second flash emission window; and
an LED flash light source disposed in the body, configured to emit a flash toward the first and second light guide members, and comprising a substrate, LEDs, and a lens member, the LEDs being mounted in a matrix in the substrate, the lens member being disposed above the LEDs and configured to produce a uniform illuminance distribution the light guide member is configured to allow the flash emitted from the LED flash light source to be emitted from the first and second flash emission windows to outside the runway-embedded flash lighting device.

2. The runway-embedded flash lighting device according to claim 1, wherein
the body and the ceiling member are integrally molded as an integrally molded product.

3. The runway-embedded flash lighting device according to claim 1, wherein
the LEDs are arranged in a rectangular shape.

4. The runway-embedded flash lighting device according to claim 3, further comprising:
a heat radiating member, wherein
the heat radiating member is disposed on the substrate of the LED flash light source on a surface opposite to an LED mounting side.

5. The runway-embedded flash lighting device according to claim 1, wherein
the light guide member is a prism lens.

6. The runway-embedded flash lighting device according to claim 1,
wherein
the lens member includes a fly-eye lens or an integrator lens.

7. The runway-embedded flash lighting device according to claim 1, wherein
the effective luminous intensity of the runway-embedded flash lighting device is 6000 cd or more, and the flash light source switches the luminous intensity among a high luminous intensity, a medium luminous intensity, and a low luminous intensity.

8. The runway-embedded flash lighting device according to claim 1, further comprising:
a fixing member, wherein
the fixing member is disposed on an outer peripheral portion of the ceiling member, and
the fixing member is provided with a fastener hole to be inserted with a fastener for fixing to the runway.

9. The runway-embedded flash lighting device according to claim 8, wherein
the fixing member is integrally molded as an integrally molded product.

10. The runway-embedded flash lighting device according to claim 1, further comprising:
a bottom cover member, wherein
the bottom cover member is disposed on and covers a lower opening of the body, and
the bottom cover member includes a cable gland and an external ground terminal.

11. The runway-embedded flash lighting device according to claim 10, wherein
the bottom cover member is attached to at least one of the body and the LED flash light source with a fastener and an O-ring, for waterproofing of the runway-embedded flash lighting device.

12. The runway-embedded flash lighting device according to claim 1, wherein
the body is cylindrical in shape.

\* \* \* \* \*